US010726432B2

United States Patent
Bag et al.

(10) Patent No.: US 10,726,432 B2
(45) Date of Patent: Jul. 28, 2020

(54) SURVEY BASED ON USER BEHAVIOR PATTERN

(71) Applicant: International Business Machines Corporation, Armonk, NY (US)

(72) Inventors: Omkar Nath Bag, Loisingha (IN); Saraswathi S. Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 15/149,310

(22) Filed: May 9, 2016

(65) Prior Publication Data
US 2017/0323314 A1 Nov. 9, 2017

(51) Int. Cl.
G06Q 30/02 (2012.01)
H04L 12/58 (2006.01)

(52) U.S. Cl.
CPC ..... G06Q 30/0203 (2013.01); G06Q 30/0201 (2013.01); H04L 51/14 (2013.01)

(58) Field of Classification Search
CPC ........ G06Q 30/02; G06Q 10/00; G06Q 99/00; H04L 1/00
USPC .............................................. 705/7.11–7.42
See application file for complete search history.

(56) References Cited

U.S. PATENT DOCUMENTS

| 6,581,071 B1 | 6/2003 | Gustman et al. |
| 7,428,750 B1 | 9/2008 | Dunn et al. |
| 7,783,249 B2 * | 8/2010 | Robinson ................ H04L 12/00 455/3.06 |
| 7,792,912 B2 | 9/2010 | Britton et al. |
| 8,249,920 B2 | 8/2012 | Smith |
| 8,380,566 B2 | 2/2013 | Smith |
| 8,769,080 B2 | 7/2014 | Cancel et al. |
| 8,978,086 B2 * | 3/2015 | Bhatia ................. H04N 21/252 725/133 |
| 2006/0173880 A1 | 8/2006 | Alberts et al. |
| 2006/0210033 A1 * | 9/2006 | Grech ............... H04M 3/42017 379/88.19 |
| 2007/0042716 A1 | 2/2007 | Goodall et al. |
| 2011/0106584 A1 | 5/2011 | Borthwick |
| 2012/0084120 A1 | 4/2012 | Hirsch |
| 2014/0108095 A1 * | 4/2014 | Tetreault ............ G06Q 30/0203 705/7.32 |
| 2014/0229236 A1 | 8/2014 | Aggarwal et al. |

(Continued)

FOREIGN PATENT DOCUMENTS

| CA | 2536524 A1 | 3/2005 | |
| EP | 1058901 A1 * | 12/2000 | ............. G06Q 30/02 |

OTHER PUBLICATIONS

Morita, Masahiro & Shinoda, Yoichi. (1994). Information Filtering Based on User Behavior Analysis and Best Match Text Retrieval. 272-281. 10.1007/978-1-4471-2099-5_28. (Year: 1994).*

(Continued)

Primary Examiner — Alan S Miller
Assistant Examiner — Jay-Ming Wang
(74) Attorney, Agent, or Firm — Stephen R. Yoder

(57) ABSTRACT

A method is provided to identify availability of a user and to prompt the user about a survey which is due on the user. The identification of availability is based on defined behavior patterns of the user. The survey is split into small components and provided to the user via multiple messaging applications.

20 Claims, 3 Drawing Sheets

(56) References Cited

U.S. PATENT DOCUMENTS

| | | | | |
|---|---|---|---|---|
| 2014/0236663 | A1* | 8/2014 | Smith | G06Q 10/0633 |
| | | | | 705/7.27 |
| 2014/0358636 | A1* | 12/2014 | Nowak | G06Q 50/01 |
| | | | | 705/7.32 |
| 2015/0350376 | A1* | 12/2015 | Vijay | H04L 67/325 |
| | | | | 709/204 |
| 2018/0108028 | A1 | 4/2018 | Bag et al. | |

OTHER PUBLICATIONS

Groves, R. M., Cialdini, R. B., & Couper, M. P. (1992). Understanding the Decision to Participate in a Survey. Public Opinion Quarterly, 56, 475-495. 10.1086/269338 (Year 1992).

Missula, Ramsyam, "Method and System for Segregating a Survey and Presenting to Users", IP.com Prior Art Database Technical Disclosure, IP.com No. 000217090, IP.com Electronic Publication Date May 2, 2012, Copyright: Yahoo! 2012, 2 Pages.

Pottier, Nicolas, "Ten Tips for Building Effective SMS Surveys", TextIt Blog, Sep. 3, 2013, Printed Mar. 3, 2016, 2 Pages, <http://www.blog.textit.in/ten-tips-for-building-effective-sms-surveys>.

"Create SMS, IVR, Kiosk, Web & Social Media Surveys", Survey Node, Copyright 2008-2015 ESJ Software Ltd—Survey Node, Printed Mar. 3, 2016, 2 Pages, <http://www.surveynode.com>.

"Free SMS Voting/Text Message Audience Polling", SMSPoll, Copyright 2008-2015 SMS Poll, Printed Mar. 3, 2016, 1 page, <http://www.smspoll.net>.

"Personalized Mobile Engagement", Urban Airship, Printed Mar. 3, 2016, 5 pages, <https://www.urbanairsip.com/products/engage>.

"Poll Everywhere", Text Message (SMS) Polls and Voting, Audience Response System, Printed May 9, 2016, 4 Pages, <https://www.polleverywhere.com>.

"Survery Application", IP.com Prior Art Database Technical Disclosure, Authors et. al.: IBM, Original Publication Date: Feb. 29, 2008, IP.com No. IPCOM00168204D, IP.com Electronic Publication Date: Feb. 29, 2008, 2 Pages.

"The Pocket Guide to Good Push", Urban Airship, 40 Pages, Retrieved on Mar. 3, 2016, <http://gobluebridge.com/wp-content/uploads/2015/04/Pocket_Guide_to_Good_Push_Web.pdf>.

Appendix P List of IBM Patents or Applications Treated as Related. dated May 16, 2018. Two pages.

* cited by examiner

SURVEY BASED ON USER BEHAVIOR PATTERN

BACKGROUND

The present invention relates generally to the field of survey, and more particularly to taking online survey via messaging services.

Survey generally applies statistics techniques to collect data about a service, a product, or an event from a certain number of people. Surveys can provide valuable information on, for example, marketing research, psychology, and/or health professionals.

Surveys can be conducted in many different ways, including through a printed questionnaire, over the telephone, by mail, in person, or on the web. A survey usually asks people for information in some structured format.

SUMMARY

In one aspect of the present invention, a method is provided comprising: dividing a survey into a set of components, each component of the set of components being assigned a responding duration; identifying a target user to receive the survey; determining a behavior pattern of the target user; identifying an availability timeframe of the target user based on the behavior pattern; generating a custom survey from a plurality of components having a combined duration that is less than or equal to the availability timeframe; and providing the custom survey to the target user via a registered messaging account.

DETAILED DESCRIPTION

Figure 1:
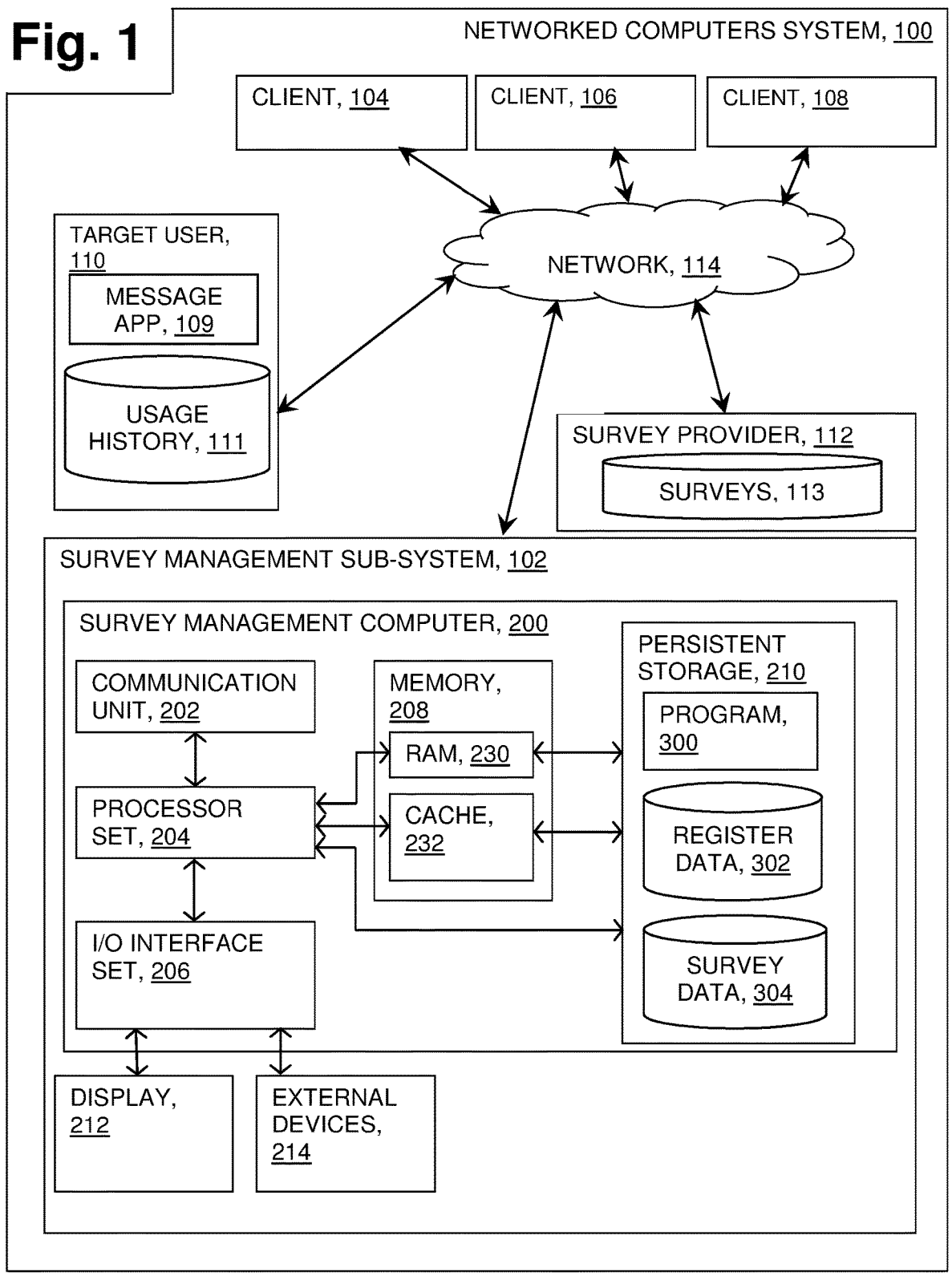
FIG. 1 is a schematic view of a first embodiment of a system according to the present invention.

A method for survey taking is provided for identifying availability of a user based on a behavior pattern of the user and providing the user a portion of a survey corresponding to the availability duration. The survey is further facilitated via multiple accounts associated with the user. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: survey management sub-system 102; client sub-systems 104, 106, 108; target user 110; message application (APP) 109; usage history 111; survey provider 112; surveys database 113; communication network 114; survey management computer 200; communication unit 202; processor set 204; input/output (I/O) interface set 206; memory device 208; persistent storage device 210; display device 212; external device set 214; random access memory (RAM) devices 230; cache memory device 232; program 300; register data 302; and survey data 304.

Client sub-system 104, 106, 108; target user 110; and survey provider 112 may be a laptop computer, tablet computer, netbook computer, personal computer (PC), a desktop computer, a personal digital assistant (PDA), a smart phone, or any programmable electronic device capable of communicating with the survey management sub-systems 102 via network 114.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Alternatively, a portion of program 300 may be stored in client sub-system 104, 106, 108, target user 110 and survey provider 112. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to split a survey into a plurality of survey components. Program 300 further provides one or more of the plurality of survey components to a user or a survey taker by determining an available time slot of the user. The survey may be taken by the user via multiple registered accounts associated with the user, and each of the multiple accounts responds one or more survey components.

Some embodiments of the present invention recognize the following facts, potential problems and/or potential areas for improvement with respect to the current state of the art: (i) most of the times surveys are optional; (ii) users may tend to attempt a survey that is not based on his busy schedule or priority items at that moment; and/or (iii) users may need extra efforts to recall about a pending survey details and links when the user finds some time to take the pending survey.

Messaging services are closer to public than ever. With people getting easier access to messaging services, messaging services are a good medium to collect survey data. Surveys have more impact as a survey taker feels like someone on the other side is interacting with them or responding to them. People spend on social networking sites or chat messengers when they have some free time or on the move, thus reaching people or sending surveys when people have some free time can improve survey results. Survey results or feedback play a crucial rule for betterment of a system or a product for which a survey is taken.

Some embodiments of the present invention provide surveys over messaging services. For example, users are provided with a link for taking a survey. Further, the users are provided with a survey facilitator identification (ID), which they ping to initiate the survey. The survey facilitator ID is generated for each user who takes participation in a survey. The user first logs in into the messaging service system using his/her user ID and password. Alternatively, if the user does not have an account the user can register one to the messaging service system or a temporary user ID/password can be provided. Once logging into the messaging service system the user pings the survey facilitator ID which has been provided to the user over mail prior to initialization of survey. The survey details are tied to the survey facilitator ID. Once the facilitator id is pinged the user is presented with instructions, questions and/or options. The user answer or respond to survey questions over the messaging service. This process will go on till the end of the survey is reached. Further, additional security measure can be integrated in between. In this example, a messaging service acts as the medium to conduct the survey.

Further, some embodiments of the present invention capture and store the answers or feedback to the survey in the database. The received answers are processed and a survey report is generated for next or corrective steps on the survey business line.

Figure 2:
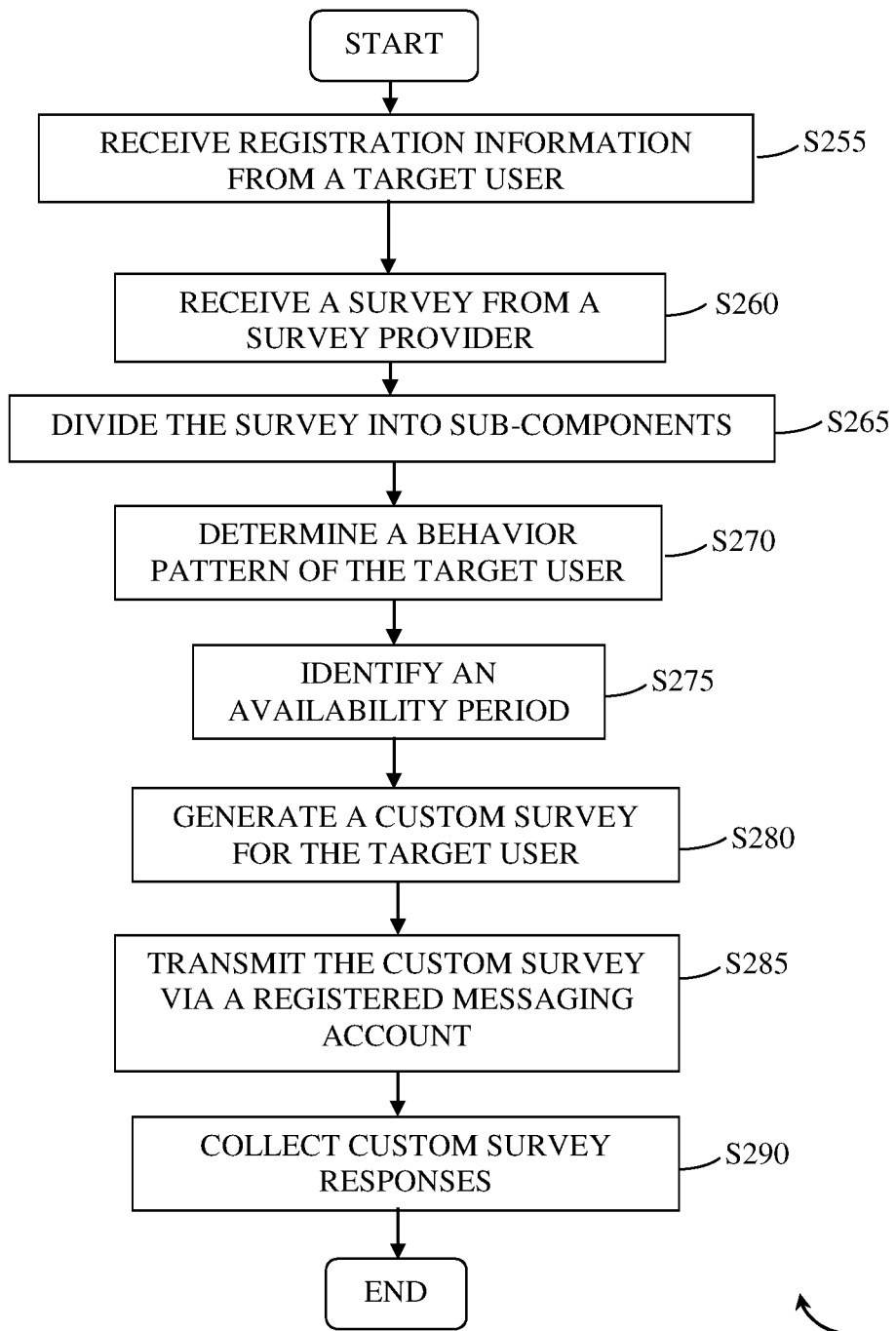
FIG. 2 is a flowchart depicting an embodiment of a method that may be performed, at least in part, by the system depicted in FIG. 1.
Figure 3:
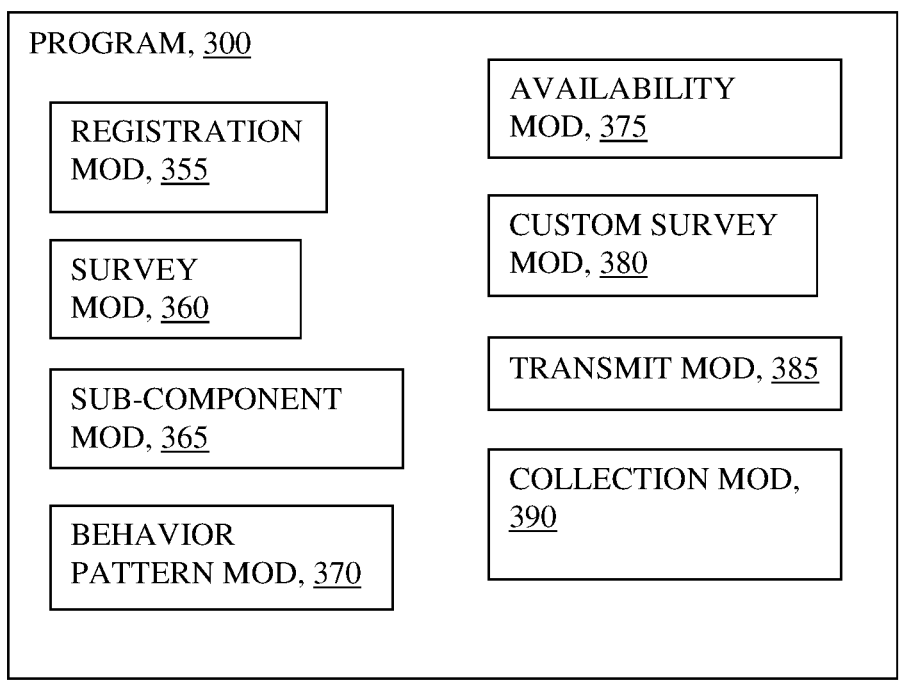
FIG. 3 is a schematic view of a machine logic (for example, software) portion of the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where registration module ("mod") 355 receives registration information from a target user. In this example, the target user 110 registers with the survey management 102 to receive surveys from the survey provider 112.

Processing proceeds to step S260, where survey module 360 receive a survey from a survey provider. In this example, the survey provider 112 is shown with surveys store 113 from which surveys are sent to survey management 102.

Processing proceeds to step S265, where sub-component module 365 divides the survey into a set of sub-components. In this example, the survey management 102 breaks up the survey into sub-components. Each sub-component of the set of survey sub-components has a corresponding responding time. In this example, a set of survey domain specific parameters include: (i) number of questions in the survey; (ii) timelines to be considered for completing the survey; (iii) participants/users demographics; and/or (iv) average time needed for a question to answer.

Some embodiments of the present invention apply analytics techniques to identify the average time needed for a question from historic survey data.

Some embodiments of the present invention define during survey question configuration an approximate time needed for completing the survey. The approximate time could be derived based on pilot run results carried by researchers during a survey composition. Both the average time and the approximate time are crucial factors in splitting the survey into small chunks/survey components.

By breaking down the survey into smaller tasks and the survey management 102 in FIG. 1 decides how much each smaller survey component can take and uses that information to deliver the right survey component to the user based on the amount of time the user will have. For example, if it is a 3 minutes song the user is listening to, a 2.5 minute chunk of the survey components could be displayed to the user, rather than a part of the survey which can take 4 or 5 minutes.

Processing proceeds to step S270, where behavior pattern module 370 determines a behavior pattern of the target user. In this example, the set of survey domain specific parameters further include: participants behavior/preferences, which facilitates deriving a behavior pattern of the user to identify a right time to remind the participant/user of the pending survey. Such behavior patterns include, but are not limited to, (i) a user listening to music on the move; (ii) a user waiting on a conference call for other participants to join; and/or (iii) a user connecting to WiFi or Internet. Such behaviors may be configured, for example 15 or 30 minutes duration. (Note: the term(s) "WiFI" may be subject to trademark rights in various jurisdictions throughout the world and are used here only in reference to the products or services properly denominated by the marks to the extent that such trademark rights may exist.)

Processing proceeds to step S275, where availability module 375 identifies an availability period of the target user. In this example, the survey management 102 determines when target user 110 is available and for how much time the target user may be available to process survey sub-components. This determination is made by accessing and/or monitoring the user's activity for an availability indicator, such as a status posting "waiting for a conference call." The availability period will be determined based on the indicator and pre-indicator application usage history 111 that provides information about the duration of the present availability. Even a calendar (not shown) may be accessed to determine when a meeting starts, etc. Further the availability determination may be based on other behavior patterns of the target user. Based on some defined behavior patterns of the user, survey management 102 detects user availability and prompts and/or reminds users about a survey which is due based on target user identification.

In some embodiments of the present invention, a user chooses or allows such behaviors/activities to be tracked to receive a prompt of survey. For example, the user can allow few activities like "listening music," "playing games," and/or "using messaging services," which indicates that the user may not be prompted if the user is on, for example, "video watch." In some embodiments of the present invention, an audio prompt option could alert the user without interrupting user actions.

In a conference call scenario, the survey prompt may be a custom configuration such as if a conference call ends before the planned conference duration. A meeting/conference call application can know that the user is in a meeting (assuming sync between the user's calendar and the meeting application). And the user has dialed into the conference from one or more of clients 104, 106, 108 in FIG. 1. The survey sub-system 102 can detect that the user is waiting for others to join or the conference moderator to start the conference, in which case, the survey sub-system 102 detects the user having some free time and will prompt the user for the survey.

Processing proceeds to step S280, where custom survey module 380 generates a custom survey for the target user. In this example, survey management 102 generates a custom survey for the target user based on the determination in step S275. Specifically, the one or more sub-components are identified based on the behavior pattern and responding times of the one or more sub-components. In this example, the survey management 102 understands/interprets the configured user behavior pattern and provides the survey questions as small chunks (one or more survey sub-components) to the user. Providing smaller survey components or portion to the user based on possible available time facilitates the user to provide responses partly.

Processing proceeds to step S285, where transmit module 385 transmits the custom survey via a registered messaging account. In this example, the custom survey made up of sub-components is sent to the target user by the survey management 102 via messaging application 109.

Processing proceeds to stop at step S290, where collection module 390 collects custom survey responses from the target user. In this example, as survey components are answered, survey management 102 stores the responses in survey store 304. When a full survey is completed, the survey management system transmits the completed survey to the survey provider.

In some embodiments of the present invention, the set of survey domain specific parameters further include: participant registered accounts, which facilitates to conduct surveys to multiple accounts of participants/users. The survey sub-system 102 is able to capture responses and tag them to relevant survey sessions.

A user/survey taker can register multiple accounts including a social networking account or a personal account in the user's organization profile. The multiple accounts further include an organization email ID of the user, and/or a personal email ID under the user's personal profile. The survey sub-system 102 tags/treats all the registered accounts as allowable channels to capture survey feedback, such that the user is facilitated to respond few questions from one account and few responses from another account. That is, the user is allowed to provide responses in any of the channels/accounts for the same survey session.

For example, if a user responds for initial three questions in a personal email and a few other questions later in social networking sites, the survey sub-system 102 is able to capture responses as under a single survey session. Based on a registered personal phone number of a user, a communication can be established for various messaging applications available and installed in users mobile devices to prompt survey due information. When the user choose "No" upon being prompted, the survey sub-system 102 tries to capture a preference slot of the user and accordingly a next reminder can be re-triggered.

Some embodiments of the present invention may include one, or more, of the following features, characteristics and/or advantages: (i) messaging services can be used to conduct a survey; (ii) a user can take a survey anytime the user want as the survey is available in a hand-held and more convenient and popular medium; and/or (iii) more users can be reached and more feedback data are captured.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product comprising a computer readable storage medium having a set of instructions stored therein which, when executed by a processor, causes the processor to perform a survey management by:
   dividing a survey into a set of survey components, each survey component of the set of survey components being assigned a respectively corresponding responding duration, the responding duration for a survey component being an estimated time required to respond to the survey component;
   identifying a target user to receive the set of survey components;
   determining a behavior pattern of the target user;
   predicting a first availability duration of the target user based on the behavior pattern, the first availability duration being a time frame in which the target user is available to respond to questions in the divided survey;
   generating a first custom survey by combining a first subset of survey components from the divided survey, the individually assigned responding durations of the first subset of survey components having a combined duration that is less than or equal to the first availability duration, the combined duration being a sum of the individually assigned responding durations of the first subset of survey components; and
   providing the first custom survey to the target user via a registered messaging account;
   generating a second custom survey by combining a second subset of survey components from the divided survey, the second subset of survey components including survey components not included in the first subset of survey components; and
   providing the second custom survey to the target user for response during a second availability duration, the second custom survey having a second combined duration that is less than or equal to the second availability duration.

2. The computer program product of claim 1, further comprising:
   prompting the target user to take the first custom survey.

3. The computer program product of claim 1, wherein:
   the responding duration for a component is calculated based on historic data collected, at least in part, during a previous response session with a previous user.

4. The computer program product of claim 1, wherein:
   the behavior pattern is determined to be that the target user is waiting on a conference call having a future start time; and
   the availability duration is the difference between a current time and the future start time.

5. The computer program product of claim 1, wherein the providing the first custom survey is performed via one or more accounts of assigned to the target user.

6. The computer program product of claim 1, further comprising:
   registering a set of messaging accounts for the target user; and
   receiving a set of user preferences including:
      contact information for each messaging account;
      a set of authorized survey providers; and
      a set of do-not-survey timeframes.

7. The computer program product of claim 6, wherein the set of messaging accounts includes an instant messaging account that displays user availability.

8. The computer program product of claim 1, further comprising:
   receiving the survey from a pre-authorized survey provider, the survey directed to the target user.

9. The computer program product of claim 1, wherein determining the behavior pattern includes:
   monitoring the registered messaging account for an availability indicator;
   storing account activity data based on the monitoring; and
   responsive to identifying the availability indicator, analyzing the account activity data stored prior to identifying the availability indicator to determine the behavior pattern.

10. The computer program product of claim 1, wherein identifying an availability duration includes:
   responsive to determining the behavior pattern, referencing an availability table having a pre-determined duration corresponding to the behavior pattern, the pre-determined duration being the availability duration.

11. The computer program product of claim 10, wherein the behavior pattern is determined to be that the target user is listening to music.

12. The computer program product of claim 1, further comprising:
   responsive to all of the survey components of the survey being answered, transmitting the responses to the survey to a survey provider;
   wherein:
   the first custom survey and the second custom survey combine to include all of the survey components of the survey.

13. A computer system comprising:
   a processor(s) set; and
   a computer readable storage medium;
   wherein:
   the processor set is structured, located, connected, and/or programmed to run program instructions stored on the computer readable storage medium; and
   the program instructions which, when executed by the processor set, cause the processor set to perform a survey management by:
      dividing a survey into a set of survey components, each survey component of the set of survey components being assigned a respectively corresponding responding duration, the responding duration for a survey component being an estimated time required to respond to the survey component;
      identifying a target user to receive the set of survey components;
      determining a behavior pattern of the target user;
      predicting a first availability duration of the target user based on the behavior pattern, the first availability duration being a time frame in which the target user is available to respond to questions in the divided survey;

generating a first custom survey by combining a first subset of survey components from the divided survey, the individually assigned responding durations of the first subset of survey components having a combined duration that is less than or equal to the first availability duration, the combined duration being a sum of the individually assigned responding durations of the first subset of survey components; and providing the first custom survey to the target user via a registered messaging account;

generating a second custom survey by combining a second subset of survey components from the divided survey, the second subset of survey components including survey components not included in the first subset of survey components; and providing the second custom survey to the target user for response during a second availability duration, the second custom survey having a second combined duration that is less than or equal to the second availability duration.

14. The computer system of claim 13, wherein:
the responding duration is calculated based on historic data collected, at least in part, during a previous response session for the survey with a previous user.

15. The computer system of claim 13, wherein:
the behavior pattern is determined to be that the target user is waiting on a conference call having a future start time; and
the availability duration is the difference between a current time and the future start time.

16. The computer system of claim 13, further comprising:
prompting the target user to take the first custom survey.

17. The computer system of claim 13, wherein determining the behavior pattern includes:
monitoring the registered messaging account for an availability indicator;
storing account activity data based on the monitoring; and
responsive to identifying the availability indicator, analyzing the account activity data stored prior to identifying the availability indicator to determine the behavior pattern.

18. The computer system of claim 13, wherein identifying an availability duration includes:
responsive to determining the behavior pattern, referencing an availability table having a pre-determined duration corresponding to the behavior pattern, the pre-determined duration being the availability duration.

19. The computer system of claim 18, wherein the behavior pattern is determined to be that the target user is listening to music.

20. The computer system of claim 13, further comprising:
responsive to all of the survey components of the survey being answered, transmitting the responses to the survey to a survey provider;
wherein:
the first custom survey and the second custom survey combine to include all of the survey components of the survey.

* * * * *